United States Patent [19]

Kawakatsu et al.

[11] Patent Number: 4,918,118

[45] Date of Patent: Apr. 17, 1990

[54] PROCESS FOR IMPROVING PROPERTIES OF SYNTHETIC RESIN POWDER

[75] Inventors: Atsushi Kawakatsu, Takasago; Ryuichi Takagi, Akashi, both of Japan

[73] Assignee: Kanegafuchi Kagaku Kogyo Kabushiki Kaisha, Osaka, Japan

[21] Appl. No.: 179,782

[22] Filed: Apr. 11, 1988

[30] Foreign Application Priority Data

Apr. 13, 1987 [JP] Japan .................................. 62-90077

[51] Int. Cl.$^4$ .......................... C08J 3/20; C08K 5/00; C08L 51/04
[52] U.S. Cl. .................................. 523/334; 524/227; 524/230; 524/310; 524/313; 524/322; 524/504; 524/532; 525/83; 525/84; 525/85; 525/86; 525/315; 525/316
[58] Field of Search ............... 524/504, 532, 322, 227, 524/230, 313, 310; 525/83–86, 315–316; 523/334

[56] References Cited

U.S. PATENT DOCUMENTS

| | | | |
|---|---|---|---|
| 3,944,630 | 3/1976 | Ide et al. | 525/310 |
| 4,034,020 | 7/1977 | Moore et al. | 525/316 |
| 4,275,178 | 6/1981 | Yusa et al. | 525/71 |
| 4,287,312 | 9/1981 | Yusa et al. | 525/86 |
| 4,526,928 | 7/1985 | Mathumoto et al. | 525/86 |
| 4,623,678 | 11/1986 | Moore et al. | 523/335 |
| 4,652,615 | 3/1987 | Hoen | 525/84 |
| 4,694,032 | 9/1987 | Kakimoto et al. | 525/316 |
| 4,778,850 | 10/1988 | Lindner et al. | 525/83 |
| 4,969,973 | 9/1987 | Kamata et al. | 525/84 |

FOREIGN PATENT DOCUMENTS 57-59929  4/1982  Japan .

Primary Examiner—Herbert J. Lilling
Attorney, Agent, or Firm—Armstrong, Nikaido, Marmelstein, Kubovcik & Murray

[57] ABSTRACT

A process for improving properties of a synthetic resin powder by subjecting a latex of a graft-copolymer whose back bone is a rubber to coagulation, and adding a lubricant to the graft-copolymer in an amount of 0.01 to 10 parts by weight based on 100 parts by weight of said graft-copolymer, and then removing water. The bulk specific gravity of a synthetic resin powder produced is large, the flowability and blocking resistance are remarkably improved in comparison with known methods and blocking during storage is prevented. Lines for transporting the powder do not become packed with the resin powder. It is possible to automatically weigh the resin powder, and the powder does not exhibit a tendency to increase in volume during mass transport.

6 Claims, No Drawings

PROCESS FOR IMPROVING PROPERTIES OF SYNTHETIC RESIN POWDER

BACKGROUND OF THE INVENTION

The present invention relates to a process for improving properties of a synthetic resin powder, and more particularly to a process for improving properties of a synthetic resin powder which comprises subjecting a latex of a graft-copolymer whose back bone is a rubber to coagulation and adding a lubricant to the obtained graft-copolymer, thereby obtaining a synthetic resin powder having excellent properties.

Various studies have hitherto been made for improving properties to be required as a powder such as fluidity and blocking resistance of a synthetic resin powder. There are, for instance, a method in which a latex of a copolymer is solidified in a gaseous phase as described in Japanese Unexamined Patent Publication No. 59929/1982, a method in which a latex of a copolymer is spray-dried, a method in which a latex of a copolymer is dispersed in a specific solvent in the state of a sphere and coagulation of the copolymer is carried out, and the like.

However, the known methods have insufficient effects for the improvement of properties of a synthetic resin powder. So, there has not yet been obtained a synthetic resin powder having the fluidity and blocking resistance to automatically weigh the resin powder and to prevent the tendency of the powder to increase in volume during mass in transport. The present inventors have considered that improvement of the properties of a synthetic resin powder is indispensable for applying to the automatic weighing and the tendency to grow larger in transport.

An object of the present invention is to provide a process for improving properties of a synthetic resin powder, thereby obtaining a resin powder sufficiently applicable to the above-mentioned requirements.

This and other objects of the present invention will become apparent from the following description.

SUMMARY OF THE INVENTION

In accordance with the present invention, there is provided a process for improving properties of a synthetic resin powder which comprises subjecting a latex of a graft-copolymer whose back bone is a rubber to coagulation, and adding a lubricant to the obtained graft-copolymer in an amount of 0.01 to 10 parts by weight based on 100 parts by weight of the graft-copolymer.

DETAILED DESCRIPTION

In the present invention, a latex of a graft-copolymer can be obtained by firstly preparing a rubber, which is a back bone of the graft-copolymer, in a usual emulsion polymerization, and then graft-copolymerizing a monomer copolymerizable with the rubber with the rubber in a usual emulsion polymerization.

The monomers used for preparing the rubber, the back bone of the graft-copolymer, are diene monomers such as butadiene, isoprene and chloroprene, and/or alkyl acrylates. The number of carbon atoms of the alkyl acrylate is generally from 4 to 11, preferably from 5 to 7.

Also, the monomers may be copolymerized with a monomer copolymerizable with the diene monomers or the alkyl acrylates. Examples of the copolymerizable monomers are, for instance, an alkyl methacrylate such as methyl methacrylate or ethyl methacrylate; a vinyl cyanide such as acrylonitrile or methacrylonitrile; an aromatic vinyl compound such as styrene or α-methyl styrene; a halogenated vinyl compound such as vinyl chloride or vinyl bromide; and the like. The copolymerizable monomers are not limited thereto.

When preparing the rubber, a cross-linking agent may be used or not. Examples of the cross-linking agents are, for instance, divinyl benzene, monoethylene glycol dimethacrylate, polyethylene glycol dimethacrylate, and the like. The cross-linking agent are not limited thereto.

A preferable rubber can be obtained by polymerizing 20 to 80 parts by weight of butadiene, 0 to 50 parts by weight of styrene, 0 to 20 parts by weight of a copolymerizable monomer with styrene or butadiene, and 0 to 5 parts by weight of the cross-linking agent, the total amount thereof being 100 parts by weight, in an emulsion polymerization.

Then, monomers copolymerizable with the rubber are graft-copolymerized with the rubber to give the graft-copolymer whose back bone is rubber. Examples of graft-copolymerizable monomers are, for instance, an alkyl acrylate such as methyl acrylate, ethyl acrylate, butyl acrylate or octyl acrylate; an alkyl methacrylate such as methyl methacrylate or ethyl methacrylate; a vinyl cyanide such as acrylonitrile or methacrylonitrile; an aromatic vinyl compound such as styrene or a α-methyl styrene; a halogenated vinyl compound such as vinyl chloride or vinyl bromide; and the like. The graft-copolymerizable monomers are not limited thereto. The graft-copolymerizable monomers are added to the rubber in the absence or presence of a cross-linking agent to graft-copolymerize. Examples of the cross-linking agent are, for instance, divinyl benzene, monoethylene glycol dimethacrylate, polyethylene glycol dimethacrylate, and the like.

It is preferable that the graft-copolymerized part in the graft-copolymer is prepared from 30 to 70 parts by weight of methyl methacrylate, 30 to 70 parts by weight of styrene, 0 to 20 parts by weight of the other copolymerizable monomer therewith and 0 to 5 parts by weight of the cross-linking agent, the total amount thereof being 100 parts by weight.

Thus obtained graft-copolymer is composed of 5 to 80 parts by weight, preferably from 20 to 60 parts by weight, of the rubber and 20 to 95 parts by weight, preferably from 40 to 80 parts by weight, of the graft-copolymerized part, the total amount thereof being 100 parts by weight. When the amount of the rubber is less than 5 parts by weight, the powder properties of fluidity and blocking resistance are so good that it is not necessary to improve them. On the other hand, when the amount is more than 95 parts by weight, it is impossible to produce a resin powder.

In the present invention, the obtained latex of the graft-copolymer whose back bone is the rubber is subjected to coagulation, and the lubricant is added to the graft-copolymer in an amount of 0.01 to 10 parts by weight, preferably from 0.1 to 3 parts by weight, based on 100 parts by weight of the graft-copolymer. When the amount of the lubricant is less than 0.01 part by weight, the properties to be required as a powder of the resin powder can be hardly improved. On the other hand, when the amount is more than 10 parts by weight, the original physical properties of the resin are lowered.

Examples of the lubricants are, for instance, a fatty acid such as stearic acid or behenic acid; a metal salt of a fatty acid such as zinc stearate or calcium stearate; an amide of a fatty acid such as oleic amide, erucic amide or ethylenebisamide; a fatty acid ester such as butyl stearate, stearyl stearate, a sorbitan fatty acid ester, e.g. sorbitan monostearate, a pentaerythritol stearic acid ester, e.g. pentaerythritol tetrastearate, a glycerine fatty acid ester, e.g. monoglyceride of oleic acid or hydrogenated castor oil; a higher alcohol such as stearyl alcohol; and the like. The lubricants are not limited thereto. The lubricants may be used alone or as an admixture thereof.

Examples of the coagulant used in the coagulation of the graft-copolymer from the latex are, for instance, an inorganic acid such as sulfuric acid, hydrochloric acid, phosphoric acid or nitric acid, and a salt thereof with an alkali metal such as sodium or potassium; an organic acid such as acetic acid, and a salt thereof with an alkali metal; a halogenated alkali metal; and the like. These coagulants may be used alone or as an admixture thereto.

The amount of the coagulant is from 0.05 to 10 parts by weight, preferably from 0.1 to 5 parts by weight, based on 100 parts by weight of the latex of the graft-copolymer. The latex is subjected to coagulation and the lubricant is added to the coagulated graft-copolymer as it is or in the state of an aqueous solution or dispersion.

The coagulated graft-copolymer is subjected to heat-treatment with steam or an electric heater at 50° to 100° C. for 10 minutes to 1 hour, then is dehydrated by using a dehydrator such as vacuum dehydrator, a centrifugal dehydrator or a press dehydrator, and finally is dried by using a dryer such as a shelf dryer or a vacuum dryer at 50° to 90° C. for 5 to 30 minutes. The lubricant can be added to the graft-copolymer at any time. For instance, the lubricant can be added to the coagulated graft-copolymer, the graft-copolymer subjected to the heat-treatment, the graft-copolymer dehydrated, the graft-copolymer dried, and the like. In the present invention, it is the most effective to coagulate the graft-copolymer and then to add the lubricant to the resulting slurry of the coagulated graft-copolymer before heat-treatment.

The present invention is more specifically described and explained by means of the following Examples and Comparative Examples in which all % and parts are by weight unless otherwise noted. It is to be understood that the present invention is not limited to the Examples and Comparative Examples, and various changes and modifications may be made in the invention without departing from the spirit and scope thereof.

EXAMPLE 1

A 5 l polymerization vessel equipped with a stirrer was charged with 200 parts of water, 1.5 parts of sodium oleate, 0.002 art of ferrous sulfate, 0.005 part of disodium ethylenediaminetetraacetate, 0.2 part of potassium phosphate, 0.2 part of formaldehyde sodium sulfoxylate, 75 parts of butadiene, 25 parts of styrene, 1.0 part of divinylbenzene and 0.1 part of diisopropylbenzene hydroperoxide, and the polymerization was conducted at 50° C. for 5 hours to give a rubber in a polymerization conversion of 98%. Then, a 5l polymerization vessel equipped with a stirrer was charged with 180 parts (solid matter: 60 parts) of the obtained rubber, 90 parts of water, 0.002 part of ferrous sulfate, 0.004 part of disodium ethylenediaminetetraacetate, 0.1 part of formaldehyde sodium sulfoxylate, 20 parts of styrene and 20 parts of methyl methacrylate, and the polymerization was conducted at 60° C. for 3 hours to give a latex of a graft-copolymer in a conversion of 99%.

There was added 300 ml of a 10% aqueous solution of hydrochloric acid to 3 l of the obtained graft-copolymer latex (graft-copolymer: 100 parts) to coagulate the graft-copolymer, to which 100 ml of a 10% aqueous emulsion of ethylenebisamide was added. After subjecting the solid matter to heat-treatment at 70° C. for 10 minutes with an electric heater and then dehydration by a Nutsche funnel, the resulting product was dried in a chamber dryer made by Satake Kagaku Kikai Kabushiki Kaisha at 60° C. for 20 hours to give a synthetic resin powder.

With respect to the obtained resin powder, a bulk specific gravity, a fluidity index, a disintegration and a shearing load were measured according to the following methods. The results are shown in Table 1.

Bulk specific gravity

The bulk specific gravity (g/ml) of the obtained resin powder is measured according to Japanese Industrial Standards (JIS) K 6721.

Fluidity index

With respect to the obtained resin powder, the fluidity index is found according to a method as described in Chemical Engineering, pages 163–168, published on Jan. 18, 1965.

That is, an angle of repose, a compressibility, a spatula angle and a uniformity (a cohesion) of the obtained resin powder are measured and four indexes are found from the results obtained as above according to a conversion table. The fluidity index is the sum of the four indexes. The larger the fluidity index, the better the fluidity.

Disintegration

The obtained resin powder is hardened into a mass with a load of 5 kg/cm$^2$ to give a cylindrical block having a diameter of 5 cm and a height of 3 cm. The block is vibrated at a frequency of 60 Hz for 100 seconds to break the block. The disintegration is as follows:

$$\text{Disintegration (\%)} = \frac{\text{A weight of the resin particles having a particle size of 18 mesh pass}}{\text{A weight of the original block}} \times 100$$

The larger the disintegration, the better the blocking resistance.

Shearing load

A PTO powder bed tester made by Sankyo Denki Kabushiki Kaisha is charged with the obtained resin powder and a direct shear test is carried out with a load of 20 kg/cm$^2$. The maximum load (kg) is shown in Table 1. The smaller the value, the better the blocking resistance.

After mixing 10 parts of the obtained resin powder, 1.2 parts of dioctyl tin mercapto stabilizer, 1 part of calcium stearate and 100 parts of a polyvinyl chloride commercially available under the trade name "Kanevinyl S 1001" made by Kanegafuchi Kagaku Kogyo Kabushiki Kaisha, the mixture was kneaded with heat at 180° C. for 8 minutes by using a roll, and the press molding was carried out at 200° C. for 15 minutes to give a sheet. A transparency and heat stability were measured as follows:

Transparency

A test piece having a length of 5 cm, a width of 5 cm and a thickness of 6 mm is prepared from the obtained sheet. As to the test piece, the light transmittance (%) is measured according to JIS K 7105.

The results are shown in Table 2.

Heat stability

A test piece having a length of 3 cm, a width of 5 cm and a thickness of 1 mm is prepared from the sheet. As to the test piece, the heat stability is measured according to JIS K 7212.

| (Estimation) | O : Excellent, that is, the test piece is hardly colored. |
| --- | --- |
| | X : Bad, that is, the test piece is colored |

EXAMPLE 2

The procedure of Example 1 was repeated except that 100 ml of a 10% aqueous dispersion of sorbitan monostearate was used instead of the ethylenebisamide dispersion to give a synthetic resin powder.

The bulk specific gravity, the fluidity index, the disintegration and the shearing load were measured in the same manner as in Example 1. The results are shown in Table 1.

Also, the transparency and the heat stability were measured in the same manner as in Example 1. The results are shown in Table 2.

EXAMPLE 3

The procedure of Example 1 was repeated except a 100 ml of a 10% aqueous dispersion of hardened castor oil was used instead of the ethylenebisamide to give a synthetic resin powder.

The bulk specific gravity, the fluidity index, the disintegration and the shearing load were measured in the same manner as in Example 1. The results are shown in Table 1.

Also, the transparency and the heat stability were measured in the same manner as in Example 1. The results are shown in Table 2.

EXAMPLE 4

The procedure of Example 1 was repeated except that 100 ml of a 10% aqueous dispersion of pentaerythritol tetrastearate was used instead of the ethylenebisamide dispersion to give a synthetic resin powder.

The bulk specific gravity, the fluidity index, the disintegration and the shearing load were measured in the same manner as in Example 1. The results are shown in Table 1.

Also, the transparency and the heat stability were measured in the same manner as in Example 1. The results are shown in Table 2.

EXAMPLE 5

The procedure of Example 1 was repeated except that 400 ml of a 25% aqueous dispersion of sorbitane monostearate was used instead of 100 ml of the ethylenebisamide dispersion to give a synthetic resin powder.

The bulk specific gravity, the fluidity index, the disintegration and the shearing load were measured in the same manner as in Example 1. The results are shown in Table 1.

Also, the transparency and the heat stability were measured in the same manner as in Example 1. The results are shown in Table 2.

COMPARATIVE EXAMPLE 1

The procedure of Example 1 was repeated except that a lubricant was not added to give a synthetic resin powder.

The bulk specific gravity, the fluidity index, the disintegration and the shearing load were measured in the same manner as in Example 1. The results are shown in Table 1.

Also, the transparency and the heat stability were measured in the same manner as in Example 1. The results are shown in Table 2.

COMPARATIVE EXAMPLE 2

The procedure of Example 1 was repeated except that 600 ml of a 25% aqueous dispersion of hydrogenated castor oil was used instead of 100 ml of the ethylene bisamide dispersion to give a synthetic resin powder.

The bulk specific gravity, the fluidity index, the disintegration and the shearing load were measured in the same manner as in Example 1. The results are shown in Table 1.

Also, the transparency and the stability were measured in the same manner as in Example 1. The results are shown in Table 2.

TABLE 1

| Ex. No. | Bulk specific gravity (g/ml) | Fluidity index | Disintegration (%) | Shearing load (kg) |
| --- | --- | --- | --- | --- |
| Ex. 1 | 0.425 | 79 | 92 | 95 |
| Ex. 2 | 0.432 | 88 | 100 | 87 |
| Ex. 3 | 0.428 | 82 | 95 | 90 |
| Ex. 4 | 0.430 | 87 | 99 | 89 |
| Ex. 5 | 0.435 | 90 | 100 | 85 |
| Com. Ex. 1 | 0.382 | 65 | 21 | 162 |
| Com. Ex. 2 | 0.436 | 89 | 100 | 84 |

TABLE 2

| Ex. No. | Transparency (%) | Heat stability |
| --- | --- | --- |
| Ex. 1 | 81 | O |
| Ex. 2 | 80 | O |
| Ex. 3 | 80 | O |
| Ex. 4 | 81 | O |
| Ex. 5 | 80 | O |
| Com. Ex. 1 | 80 | O |
| Com. Ex. 2 | 72 | X |

According to the present invention, the bulk specific gravity of the synthetic resin powder can be made large, and the fluidity and the blocking resistance can be remarkably improved in comparison with known method without impairing the original properties of the resin. Therefore, not only the blocking during storage can be prevented or a line for transport is not packed with the powder, but also it is possible to automatically weigh the powder or it is applicable to the tendency to grow larger in transport.

In addition to the ingredients used in the Examples, other ingredients can be used as set forth in the specification to obtain substantially the same results.

What we claim is:

1. A process for preparing a powdery synthetic resin which comprises: subjecting a latex of a graft-copolymer, having a rubber back bone, to coagulation,
   heat treating the coagulated graft-copolymer,
   adding a lubricant to the coagulated graft-copolymer in an amount of 0.01 to 10 parts by weight based on 100 parts by weight of said graft-copolymer before or after heat treatment, and then
   removing water from the resulting mixture, thereby forming the mixture into a dried powder.

2. The process of claim 1, comprising adding said lubricant to the coagulated latex, and heat-treating, dehydrating and drying the resulting mixture.

3. The process of claim 1, comprising heat-treating the coagulated latex, adding the lubricant to the heat-treated latex, and dehydrating and drying the coagulated latex.

4. The process of claim 1, comprising heat-treating and dehydrating the coagulated latex, adding said lubricant to the dehydrated latex, and drying the resulting mixture.

5. The process of claim 1, wherein said lubricant is an aqueous solution.

6. The process of claim 1, wherein said lubricant is a dispersion.

* * * * *